United States Patent
Perumal et al.

(10) Patent No.: US 10,715,449 B2
(45) Date of Patent: Jul. 14, 2020

(54) LAYER 2 LOAD BALANCING SYSTEM

(71) Applicant: Dell Products L.P., Round Rock, TX (US)

(72) Inventors: Narayanaswamy Perumal, Tamilnadu (IN); Dinesh Babu Kannan, Tamil Nadu (IN); Balaji Venkat Venkataswami, Tamilnadu (IN)

(73) Assignee: Dell Products L.P., Round Rock, TX (US)

( * ) Notice: Subject to any disclaimer, the term of this patent is extended or adjusted under 35 U.S.C. 154(b) by 137 days.

(21) Appl. No.: 16/112,352

(22) Filed: Aug. 24, 2018

(65) Prior Publication Data

US 2020/0067838 A1 Feb. 27, 2020

(51) Int. Cl.
*H04L 12/803* (2013.01)
*H04L 12/743* (2013.01)

(52) U.S. Cl.
CPC ........ *H04L 47/125* (2013.01); *H04L 45/7453* (2013.01)

(58) Field of Classification Search
None
See application file for complete search history.

(56) References Cited

U.S. PATENT DOCUMENTS

| 2010/0115174 A1* | 5/2010 | Akyol | G06F 13/385 |
| | | | 710/316 |
| 2012/0087372 A1* | 4/2012 | Narasimhan | H04L 45/245 |
| | | | 370/392 |
| 2014/0067914 A1* | 3/2014 | Nishii | H04L 67/1008 |
| | | | 709/203 |

* cited by examiner

*Primary Examiner* — Saba Tsegaye
(74) *Attorney, Agent, or Firm* — Haynes and Boone, LLP

(57) ABSTRACT

A layer 2 load balancing system includes server devices that provide virtual machines that each share a virtual Media Access Control (MAC) address. A switch device is coupled to each of the server devices via respective ports on the switch device. The switch device receives the virtual MAC address during a time period via each of the respective ports connected to the server devices and, in response, identifies a server device cluster that shares the virtual MAC address. When the switch device receive packets that are part of a packet flow and that are directed to the virtual MAC address, it then directs each of the packets that are part of the packet flow to one of the virtual machines that is provided on one of the server devices in the server device cluster.

20 Claims, 6 Drawing Sheets

LAYER 2 LOAD BALANCING SYSTEM

BACKGROUND

The present disclosure relates generally to information handling systems, and more particularly to providing for layer 2 load balancing in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, are often connected to groups of server devices that are configured to provide services to client devices via the switch device. In some scenarios, the switch device may have ports that are connected to the server devices via layer 2 connections (e.g., broadcast Media Access Control (MAC) level network connections) rather than layer 3 connections (e.g., segmented routing connections utilizing an Internet Protocol network.) Furthermore, it may be desirable for the server devices to provide services based on a single MAC address (e.g., a virtual MAC address) that is assigned to virtual machines that are provided by each of the server devices and that include application(s) that provide the services. However, such scenarios cause issues with load balancing traffic to the server devices via the layer 2 connections. Conventional load balancing techniques operate based on layer 3 connectivity, with hashing operations performed on data in fields of a packet header of a packet that is directed to the server devices, and the result encapsulated using a virtual IP address. However, such techniques do not work when the connections between the switch device and the server devices are layer 2 connections (e.g., the switch device is a purely layer 2 switch, the ports on the switch device are connected to the server devices via purely layer 2 connections, etc.), and the virtual machines provided on the server devices advertise a common virtual MAC address.

For example, when virtual machines provided on multiple server devices provide Gratuitous Address Resolution Protocol (GARP) communications including the same virtual MAC address (which is shared by each of those virtual machines provided by the server devices, as discussed above), as well as their mapping to an IP address (or multiple IP addresses), the switch device will interpret the same MAC address received on its different ports as a MAC-move (i.e., that the MAC address has moved from one port on the switch device to another), which results in the switch device learning the virtual MAC address on a "new" port, flushing that MAC address on the "old" port, and/or performing other MAC-move operations known in the art. As such, the switch device will be unable to perform layer 2 load balancing with packets that are directed to the server devices and, in particular, to the service being provided by an application on virtual machines provided on each of those server devices.

Accordingly, it would be desirable to provide a layer 2 load balancing system that does not suffer from the issues discussed above.

SUMMARY

According to one embodiment, an Information Handling System (IHS) includes a processing system; and a memory system that is coupled to the processing system and that includes instructions that, when executed by the processing system, cause the processing system to provide a layer 2 load balancing engine that is configured to: receive, during a first time period via each of a plurality of first ports that are connected to respective first server devices that provide a plurality of first virtual machines, a first virtual MAC address; identify, in response to receiving the first virtual MAC address via each of the plurality of first ports, a first server device cluster that shares the first virtual MAC address; receive packets that are part of a first packet flow and that are directed to the first virtual MAC address; and direct each of the packets that are part of the first packet flow to one of a plurality of first virtual machines that is provided on one of the plurality of first server devices in the first server device cluster.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
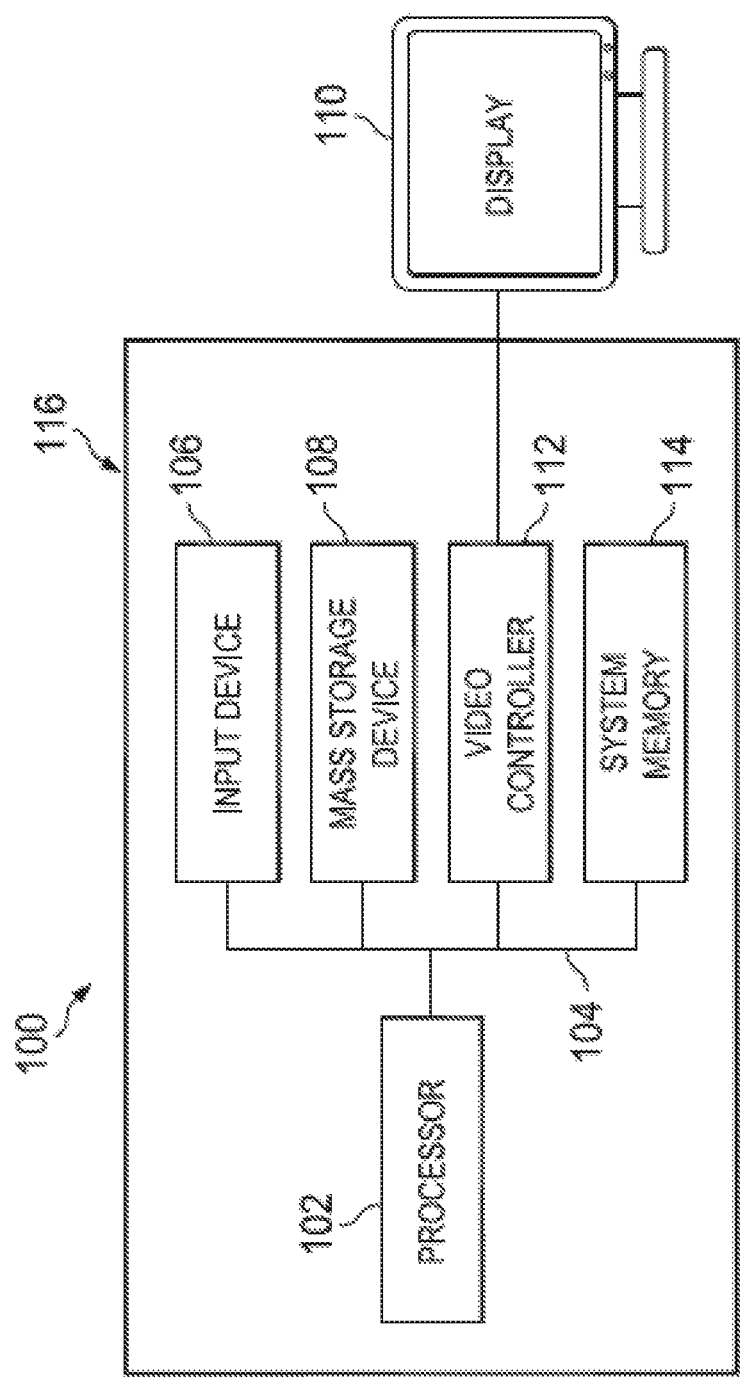
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
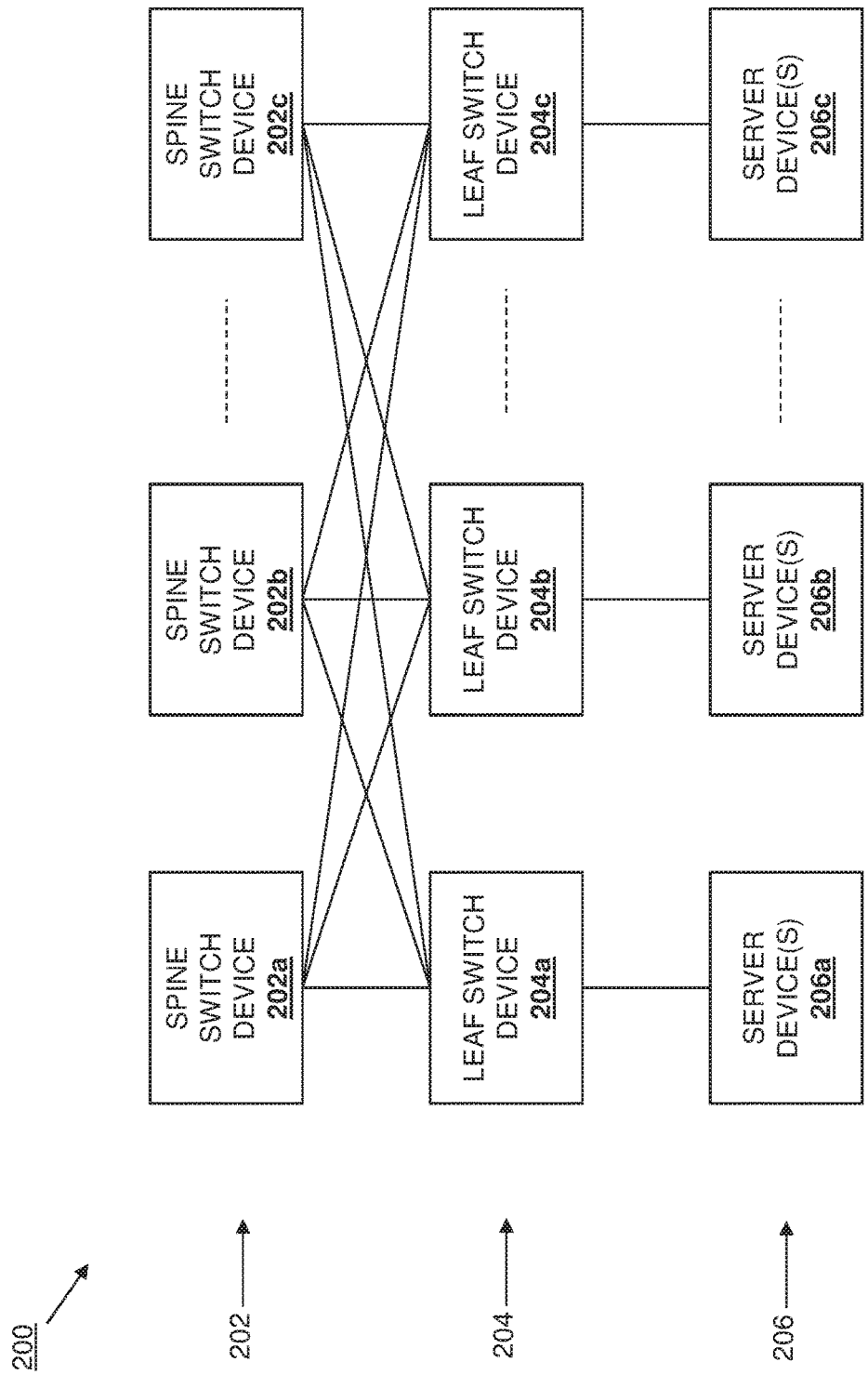
FIG. 2 is a schematic view illustrating an embodiment of a datacenter in which the layer 2 load balancing of the present disclosure may be performed.

Referring now to FIG. 2, an embodiment of a datacenter 200 is illustrated in which the layer 2 load balancing of the present disclosure may be performed. In the illustrated embodiment, the datacenter 200 includes a spine layer 202 having a plurality of spine switch devices 202a, 202b, and up to 202c. Any or all of the spine switch devices 202a-c may be provided by the IHS 100 discussed above with reference to FIG. 1, and/or may include some or all of the components of the IHS 100. While not illustrated in FIG. 2, one of skill in the art in possession of the present disclosure will recognize that any or all of the spine switch devices 202a-c in the spine layer 202 may be coupled to other devices and/or a network such as a Local Area Network (LAN), the Internet, and/or a variety of other networks known in the art. The datacenter 200 also includes a leaf layer 204 having a plurality of leaf switch devices 204a, 204b, and up to 204c. Any or all of the leaf switch devices 204a-c may be provided by the IHS 100 discussed above with reference to FIG. 1, and/or may include some or all of the components of the IHS 100. In the illustrated embodiment, each of the leaf switch devices 204a-c in the leaf layer 204 is coupled to each of the spine switch devices 202a-c in the spine layer 202. However, one of skill in the art in possession of the present disclosure will recognize that any or all of the leaf switch devices 204a-c in the leaf layer 202 may be coupled to the spine switch devices 204a-c in the spine layer 204 in a different manner than what is illustrated in FIG. 2 while remaining within the scope of the present disclosure.

The datacenter 200 also includes a server layer 206 having sets of server devices 206a, 206b, and up to 206c. Any or all of the server devices 206a-c may be provided by the IHS 100 discussed above with reference to FIG. 1, and/or may include some or all of the components of the IHS 100. In the illustrated embodiment, a set of server devices 206a in the server layer 206 is coupled to the leaf switch device 202a in the leaf layer 202, a set of server devices 206b in the server layer 206 is coupled to the leaf switch device 202b in the leaf layer 202, and a set of server devices 206c in the server layer 206 is coupled to the leaf switch device 202c in the leaf layer 202. However, one of skill in the art in possession of the present disclosure will recognize that, in some embodiments, server devices in the server layer 206 may be coupled to more than one leaf switch device in the leaf layer 202 while remaining within the scope of the present disclosure. While a specific datacenter 200 has been illustrated and described, one of skill in the art in possession of the present disclosure will recognize that datacenters may include a variety of components and/or component configurations for performing conventional datacenter functionality, as well as the functionality discussed below, while remaining within the scope of the present disclosure. Furthermore, one of skill in the art in possession of the present disclosure will recognize that the teachings of the present disclosure may be implemented in computing architectures other than datacenters while remaining within the scope of the present disclosure as well.

Figure 3:
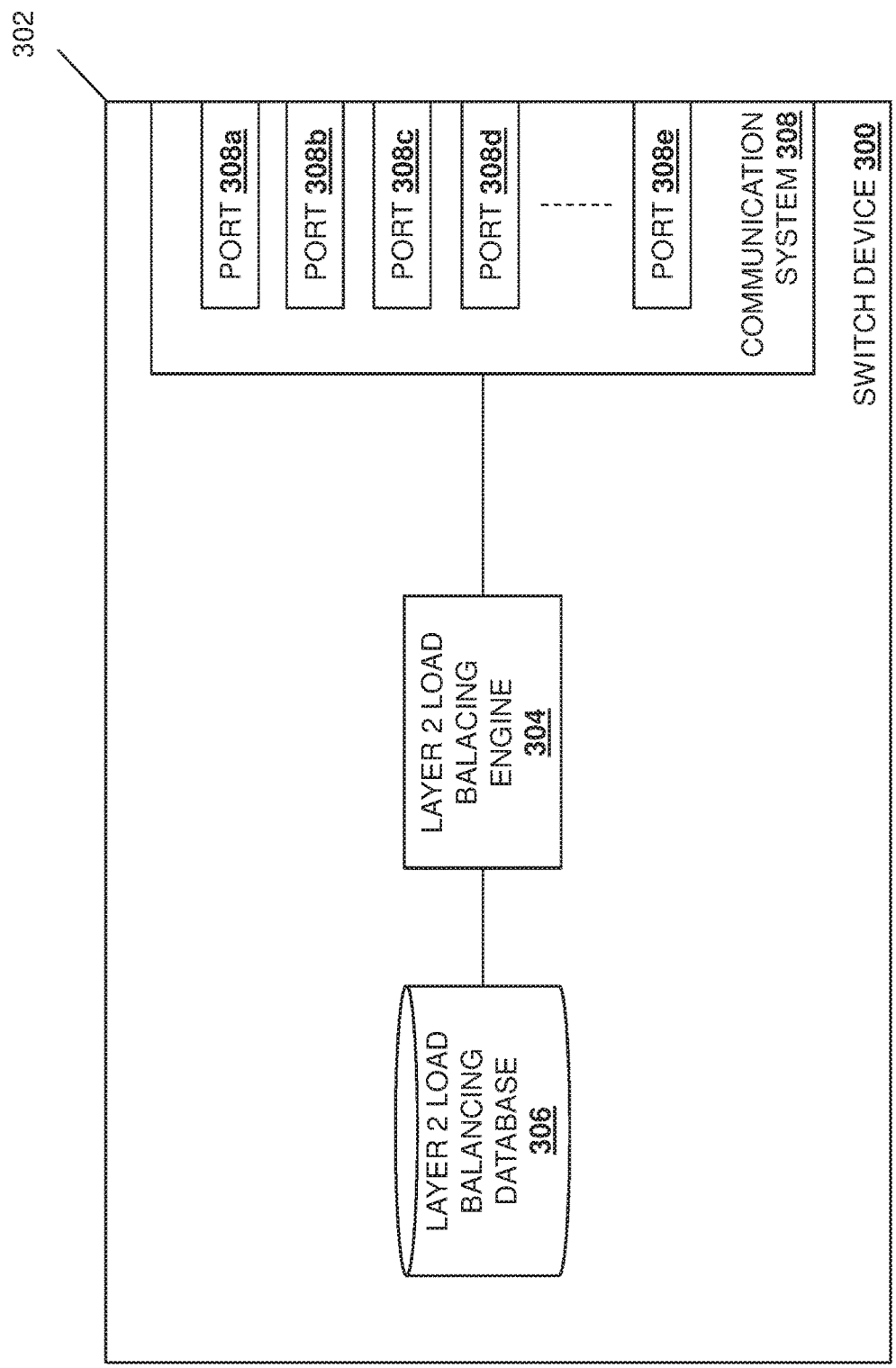
FIG. 3 is a schematic view illustrating an embodiment of a switch device that may be provided in the datacenter of FIG. 2, and that may perform the layer 2 load balancing of the present disclosure.

Referring now to FIG. 3 is a schematic view illustrating an embodiment of a switch device 300 that may be provided in the datacenter 200 of FIG. 2, and that operates to perform the layer 2 load balancing of the present disclosure. In the examples discussed below, the switch device 300 is used to provide any of the leaf switch devices 204a-c in the leaf layer 204 of the datacenter 200, but one of skill in the art in possession of the present disclosure will recognize that the switch device 300 may be provide the functionality discussed below in other scenarios as well while remaining within the scope of the present disclosure. As such, the switch device 300 may be provided by the IHS 100 discussed above with reference to FIG. 1, and/or may include some or all of the components of the IHS 100. In the illustrated embodiment, the switch device 300 includes a chassis 302 that houses the components of the switch device 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that includes instructions that, when executed by the processing system, cause the processing system to provide a layer 2 load balancing engine 304 that is configured to perform the functions of the layer 2 load balancing engines and switch devices discussed below.

Furthermore, one of skill in the art in possession of the present disclosure will recognize that conventional Network Processing Units (NPUs) that are typically used as the processing system in switch devices may not support the layer 2 load balancing functionality of the layer 2 load balancing engine 304 discussed below. For example, with respect to NPUs currently available in the industry, the functionality of the layer 2 load balancing engine 304 may require support in the NPUs (e.g., "merchant silicon")

and/or other hardware. As such, the switch device 300 may be provided with a novel NPU or other processing system that is configured to support the layer 2 load balancing engine 304 and corresponding functionality described below.

The chassis 302 may also house a storage system (not illustrated, but which may include the storage device 108 discussed above with reference to FIG. 1) that is coupled to the layer 2 load balancing engine 304 (e.g., via a coupling between the storage device and the processing system) and that includes a layer 2 load balancing database 306 that is configured to store any of the data utilized by the layer 2 load balancing engine 304 discussed below. The chassis 302 may also house a communication system 308 that is coupled to the layer 2 load balancing engine 304 (e.g., via a coupling between the communication system 308 and the processing system) and that may include a Network Interface Controller (NIC), wireless communication subsystems (e.g., WiFi communication subsystems, BLUETOOTH® communication subsystems, Near Field Communication (NFC) communication subsystems, etc.), and/or other communication components that would be apparent to one of skill in the art in possession of the present disclosure. In the embodiment illustrated in FIG. 3, the communication system 308 includes a plurality of ports 308a, 308b, 308c, 308d, and up to 308e, each of which is configured to be coupled to a server device (e.g., in the server layer 206 of the datacenter 200 of FIG. 2) as discussed below. While a specific switch device 300 has been illustrated, one of skill in the art in possession of the present disclosure will recognize that switch devices may include a variety of components and/or component configurations for performing conventional functionality, as well as the functionality described below, while remaining within the scope of the present disclosure.

Figure 4:
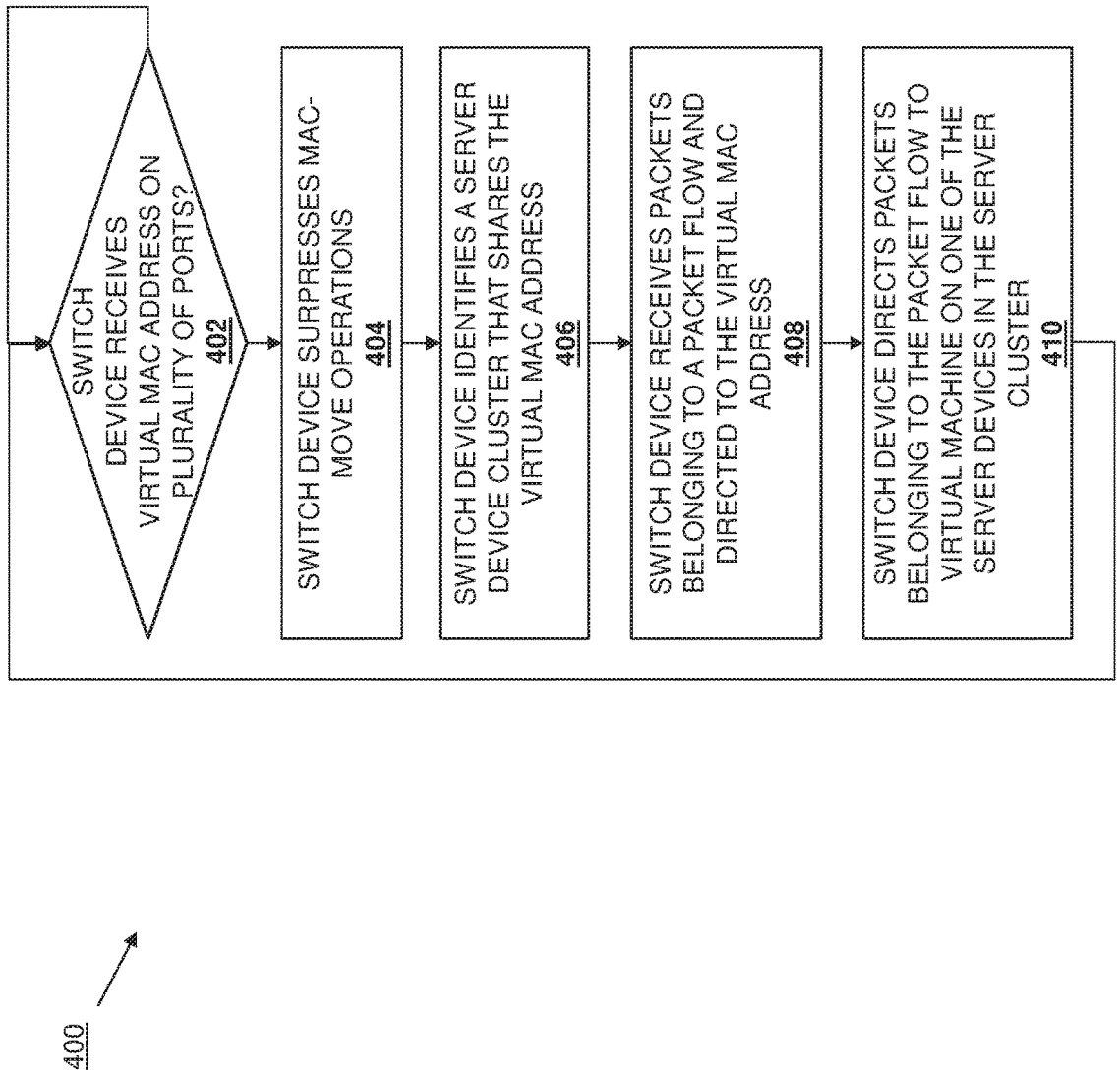
FIG. 4 is a flow chart illustrating an embodiment of a method for providing layer 2 load balancing.

Referring now to FIG. 4, and embodiment of a method 400 for providing layer 2 load balancing is illustrated. As discussed below, the systems and methods of the present disclosure address problems associated with layer 2 switch devices (or switch devices connected via layer 2 connections) receiving the same virtual MAC address from different server devices connected to different ports on that switch device, which conventionally results in the switch device performing MAC-move operations that prevent the performance of load balancing for those server devices on packets directed to that virtual MAC address. This is accomplished, at least in part, by the switch device accepting the same virtual MAC address at any of a plurality of its ports (e.g., via Gratuitous ARP communications from the server devices coupled to the ports), and suppressing MAC-move operations (e.g., not indicating that the virtual MAC address is associated with a MAC-move). The switch device may identify the server devices that provide the virtual MAC address to its ports as part of a server device cluster (while excluding server devices that do not provide the virtual MAC address to any of its ports as part of that server device cluster), and then may perform hashing operations on packets that are directed to the virtual MAC address based on fields in their packet headers, which provides for the directing of each of the packets that are part of a particular packet flow to particular virtual machines provided on particular server devices in the server device cluster. As such, purely layer 2 switch devices (or switch devices connected to server devices by purely layer 2 connections) may load balance packets to multiple server devices that are connected to its different ports and that include virtual machines that share a common virtual MAC address to which those packets are directed. One of skill in the art in possession of the present disclosure will recognize that the techniques described herein may be utilized with unicast communications, and may not apply to multicast communications.

The method 400 begins at decision block 402 where a switch device determines whether a virtual Media Access Control (MAC) address has been received on a plurality of ports. As would be understood by one of skill in the art in possession of the present disclosure, server devices may be configured to provide virtual machines, and those virtual machines may be configured with applications that provide services for client devices that communicate with the server devices. In many embodiments, a common application providing a common service may be provided on different virtual machines that are located on different server devices. For example, a high demand service may require an application on many different virtual machines provided by many different server devices. Similarly, in some embodiments, a first common application providing a first common service may be provided on different first virtual machines that are located on different first server devices, while a second common application providing a second common service may be provided on different second virtual machines that are located on different second server devices. For example, multiple high demand services may require respective applications on many different virtual machines provided by many different server devices. In either situation, the set of virtual machines providing the common application(s) may be configured to a common virtual MAC address.

Figure 5:
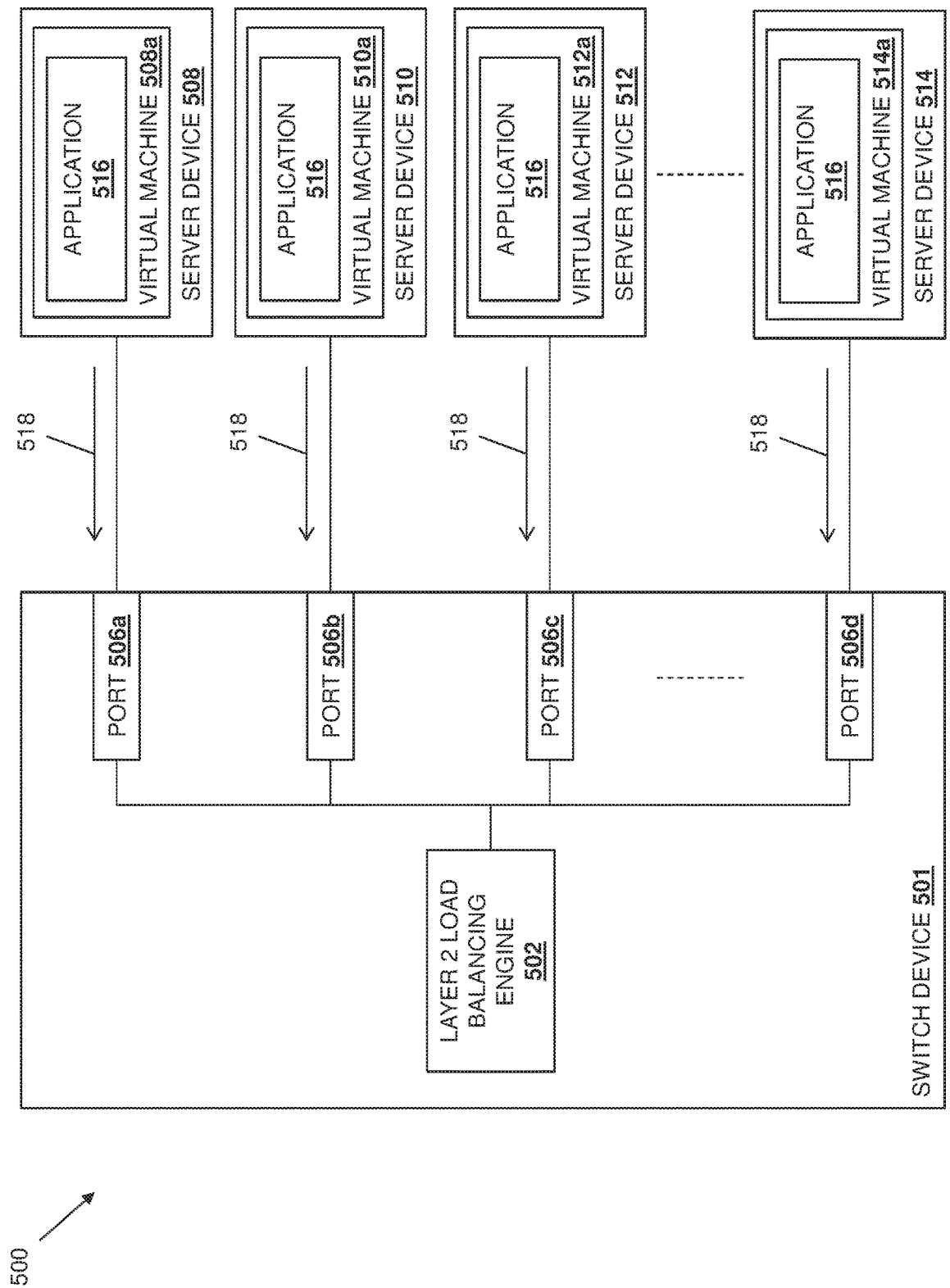
FIG. 5 is a schematic view illustrating an embodiment of the switch device of FIG. 3 performing layer 2 load balancing according to the method of FIG. 4.

With reference to FIG. 5, an embodiment of the layer 2 load balancing system 500 is illustrated for the purposes of some of the examples provided below. The layer 2 load balancing system 500 includes a switch device 501 that may be provided by the switch device 300 discussed above with reference to FIG. 3. As such, the switch device 501 includes a layer 2 load balancing engine 502 that may be provided by the layer 2 load balancing engine 304 discussed above with reference to FIG. 3, and ports 506a, 506b, 506c, and up to 506d that may be provided in the communication system 308 (e.g., similar to the ports 308-308e discussed above with reference to FIG. 3.) As illustrated in FIG. 5, a server device 508 that includes a virtual machine 508a is connected to the port 506a (e.g., via cabling or other coupling techniques known in the art), a server device 510 that includes a virtual machine 510a is connected to the port 506b (e.g., via cabling or other coupling techniques known in the art), a server device 512 that includes a virtual machine 512a is connected to the port 506c (e.g., via cabling or other coupling techniques known in the art), and a server device 514 that includes a virtual machine 514a is connected to the port 506d (e.g., via cabling or other coupling techniques known in the art). In the illustrated embodiment, each of the virtual machines 508a, 510a, 512a, and 514a provides a common application 516 that, as discussed below, is configured to provide services to client devices coupled to the switch device 501 (e.g., client devices connected to the datacenter 200 of FIG. 2 via a network). As such, each of the virtual machines 508a-514a may be configured with the same virtual MAC address. However, while each server device 508-514 is illustrated and described as providing a single virtual machine 508a-514a, respectively, one of skill in the art in possession of the present disclosure will recognize that server devices may (and typically do) provide multiple virtual machines, and such multi-virtual machine server devices will fall within the scope of the present disclosure as well.

Figure 6:
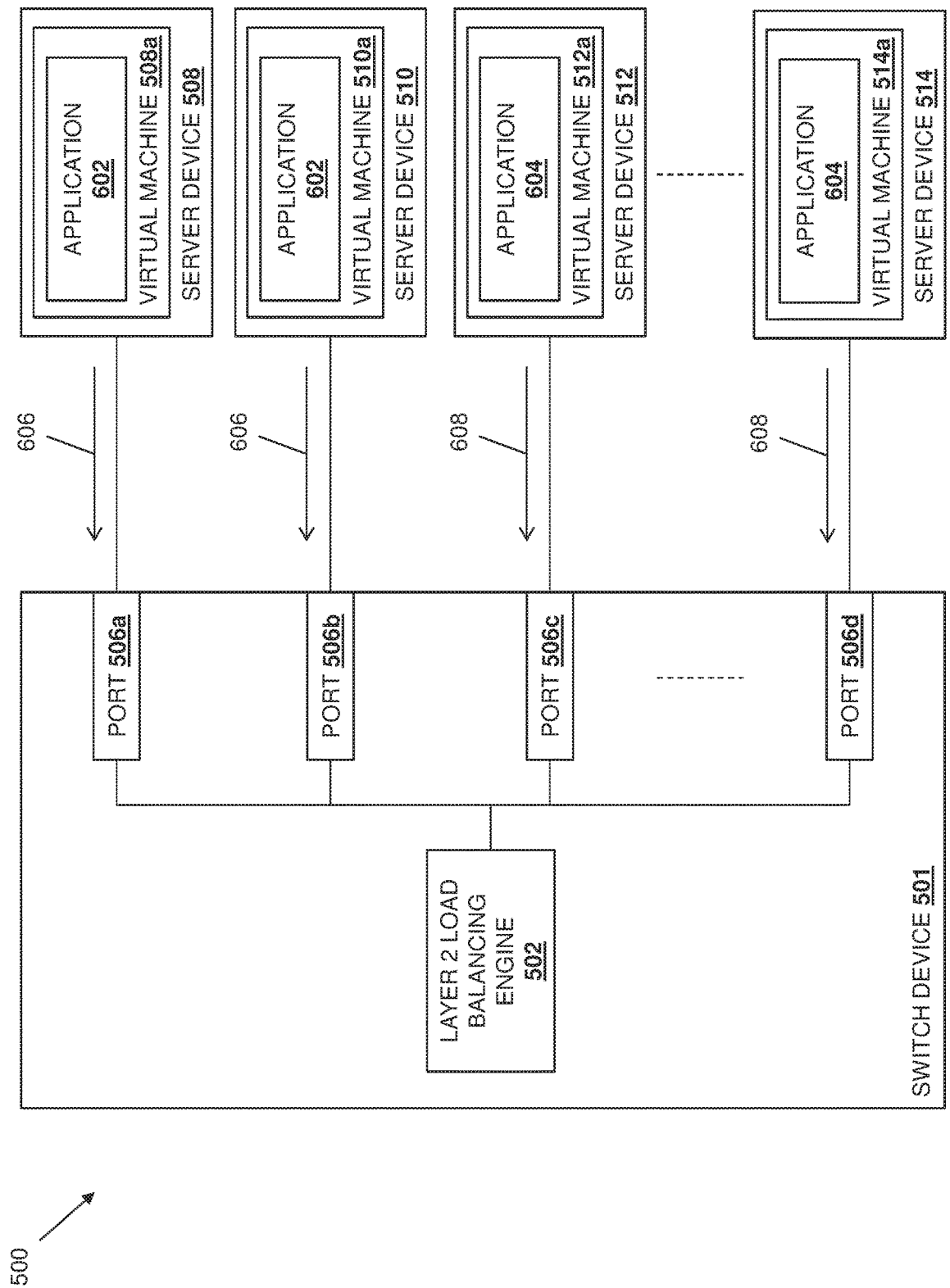
FIG. 6 is a schematic view illustrating an embodiment of the switch device of FIG. 3 performing layer 2 load balancing according to the method of FIG. 4.

With reference to FIG. 6, an embodiment of the layer 2 load balancing system 600 is illustrated for the purposes of some of the examples provided below. The layer 2 load balancing system 600 is substantially similar to the layer 2 load balancing system 500 discussed above with reference to FIG. 5 and, as such, similar elements are provided with similar reference numbers. However, in the illustrated embodiment, the virtual machines 508a and 510a provided on the server devices 508 and 510, respectively, provide a common application 602 that, as discussed below, is configured to provide first services to client devices coupled to the switch device 501 (e.g., client devices connected to the datacenter 200 of FIG. 2 via a network), while the virtual machines 512a and 514a provided on the server devices 512 and 514, respectively, provide a common application 604 that, as discussed below, is configured to provide second services to client devices coupled to the switch device 501 (e.g., client devices connected to the datacenter 200 of FIG. 2 via a network) that are different than the first services provided by the common application 602. As such, each of the virtual machines 508a and 510a may be configured with the same virtual MAC address (e.g., a "first" virtual MAC address), and each of the virtual machines 512a and 514a may be configured with the same virtual MAC address (e.g., a "second" virtual MAC address that is different than the first virtual MAC address.) Similarly as discussed above, while each server device 508-514 is illustrated and described as providing a single virtual machine 508a-514a, respectively, one of skill in the art in possession of the present disclosure will recognize that server devices may (and typically do) provide multiple virtual machine, and such multi-virtual machine server devices will fall within the scope of the present disclosure as well.

In an embodiment, at block 402, the layer 2 load balancing engine 304 in the switch device 300 may operate to determine whether the same virtual MAC address has been received on a plurality of the ports 308a-308e in the communication system 308. In some embodiments, the layer 2 load balancing engine 304 in the switch device 300 may be configured (e.g., via data stored in the layer 2 load balancing database 306) with a time period during which the layer 2 load balancing engine 304 will monitor for the receipt of virtual MAC addresses from server devices coupled to the switch device 300. For example, the time period may be a particular amount of time elapsed subsequent to the startup, reset, and/or other initialization of the switch device 300. In another example, the time period may be a particular amount of time elapsed after the receipt of a virtual MAC address from one of the server devices coupled to the switch device 300. While a few examples have been provided, one of skill in the art in possession of the present disclosure will recognize that the time period selected for determining whether the same virtual MAC address has been received on different ports from multiple server devices may be any amount of time, and may be selected in a variety of manners while remaining within the scope of the present disclosure.

With reference to the embodiment illustrated in FIG. 5, at block 402 the virtual machines 508a-514a may each transmit their shared virtual MAC address to the ports 506a-d, respectively, such that it is received by the layer 2 load balancing engine 502 during the time period. For example, each of the virtual machines 508a-514a may generate and transmit a Gratuitous Address Resolution Protocol (GARP) communication 518 that includes the shared virtual MAC address to the ports 506a-d, respectively, such that those GARP communications 518 are received by the layer 2 load balancing engine 502 during the time period. Similarly, with reference to the embodiment illustrated in FIG. 6, at block 402 the virtual machines 508a and 510a may each transmit their shared "first" virtual MAC address to the ports 506a and 506b, respectively, such that it is received by the layer 2 load balancing engine 502 during a first time period. For example, each of the virtual machines 508a and 510a may generate and transmit a GARP communication 606 that includes the shared first virtual MAC address to the ports 506a and 506b, respectively, such that those GARP communications 606 are received by the layer 2 load balancing engine 502 during the first time period.

With regard to ARP requests for virtual MAC addresses that are received from "north facing ports" on the switch device, it is noted that the switch device may be responsible for replying to those ARP requests with the virtual MAC address to any devices seeking to discover a specific virtual MAC address for a service provided by the virtual machines connected to the "south facing ports" on the switch device. One of skill in the art in possession of the present disclosure will recognize that the virtual MAC address is typically provided on the switch device explicitly in the configuration, and the switch hardware and software may be configured to reply to ARP requests through its uplink ports with the virtual MAC address provided on the switch device and related to the server cluster/port cluster.

As can be seen in FIG. 4, if at decision block 402 the switch device determines that a virtual MAC address has not been received on a plurality of ports, the method 400 loops through decision block 402 to monitor for the receipt of a virtual MAC address on a plurality of ports. If, at decision block 402, the switch device determines that a virtual MAC address has been received on a plurality of ports, the method 400 then proceeds to block 404 where the switch device suppresses MAC-move operations. In an embodiment, at block 404, the layer 2 load balancing engine 304 may operate to suppress MAC-move operations. As discussed above, when multiple server devices provide the same virtual MAC address (e.g., via a GARP communication), conventional switch devices interpret the receipt of that common virtual MAC address on its different ports as a MAC-move (i.e., that the MAC address has moved from one port on the switch device to another), which conventionally results in the switch device learning the virtual MAC address on a "new" port, flushing that MAC address on the "old" port, and/or performing other MAC-move operations known in the art.

However, the layer 2 load balancing engine 304 and/or the switch device 300 of the present disclosure may be configured to suppress MAC-move operations such that the receipt of the same virtual MAC address on the plurality of different ports at block 402 does not result in the switch device 300 performing the MAC-move operations discussed above. In some embodiments, the layer 2 load balancing engine 304 and/or the switch device 300 may be configured to suppress MAC-move operations when the same virtual MAC address is received on different ports 308a-e within the time period discussed above (e.g., while being configured to perform those MAC-move operations when the same virtual MAC address is received on different ports 308a-e outside of that time period.) In other embodiments, the layer 2 load balancing engine 304 and/or the switch device 300 may be configured to suppress MAC-move operations by being not being configured to perform MAC-move operations when the same virtual MAC address is received within any time period. While a few examples of the suppression of MAC-move operations have been described, one of skill in the art in possession of the present disclosure will recognize that MAC-move operations may be suppressed in a variety of manners that will fall within the scope of the present disclosure as well.

The method 400 then proceeds to block 406 where the switch device identifies a server device cluster that shares the virtual MAC address. In an embodiment, at block 406, the layer 2 load balancing engine 304 in the switch device 300 may operate to identify a server device cluster that includes server devices that share a common virtual MAC address. For example, at block 406, the layer 2 load balancing engine 304 in the switch device 300 may identify a server device cluster that includes server devices from which it received GARP communications that included a common virtual MAC address within the time period on different ports 308a-e, and may exclude server devices from that service device cluster that did not provide the common virtual MAC address in a GARP communication during that time period on any of the ports 308a-e. With reference to FIG. 5, at block 406 the layer 2 load balancing engine 502 may identify a server device cluster that includes the server devices 508-514 that are connected to the port 506a-d and that each provided a GARP communication 518 including a common virtual MAC address within the time period. With reference to FIG. 6, at block 406 the layer 2 load balancing engine 502 may identify a first server device cluster that includes the server devices 508 and 510 that are connected to the port 506a and 506b, and that each provided a GARP communication 606 including a common first virtual MAC address within the first time period.

As would be understood by one of skill in the art in possession of the present disclosure, the identification of the server device cluster at block 406 may be associated with the identification of a corresponding port cluster (i.e., including the ports 308a-e through which the server devices in the server device clusters are connected to the switch device 300, and through which the server devices communicated their corresponding GARP communications.) Furthermore, the port cluster identified at block 406 may be treated by the layer 2 load balancing engine 304 in the switch device 300 as a Link Aggregation Group (LAG), with layer 2 load balancing performed on packets destined for a virtual MAC address shared by virtual machines provided on server devices that are reachable via that LAG. In some embodiments, a scan may be performed based on configurable values for virtual MAC addresses representing the server device cluster and corresponding port cluster facing the server devices in the server device cluster, which may allow for the suppression of MAC-move operations when the same virtual MAC addresses are received by multiple ports in the port cluster. Furthermore, in some embodiments, the communication system 308 of the switch device 300 may include a "northbound" or "uplink" port that hides the virtual-MAC-address-based server/port clustering from the devices (e.g., the spine switch devices 202a-c and/or other devices) in in the network connected to that port.

The method 400 then proceeds to block 408 where the switch device receives packets that belong to a packet flow and that are directed to the virtual MAC address shared by the server device cluster identified at block 406. As discussed above, client devices connected to the datacenter 200 of FIG. 2 via a network may utilized services provided by applications on virtual machines provided on the server devices 206a-c, and that service utilization may be accomplished via the communication of packets between those client devices and the server devices 206a-d via the spine switch devices 202a-c and the leaf switch devices 204a-c. As such, in an embodiment of block 408, the layer 2 load balancing engine 304 in the switch device 300 may receive (e.g., via a northbound/uplink port in the communication system 308 that is coupled to a spine switch device 202a, 202b, or 202c) a packet that was generated and transmitted by a client device, and that is directed to a virtual MAC address shared by the virtual machines provided on the server devices. As would be understood by one of skill in the art in possession of the present disclosure, client devices may generate packets as part of a packet flow that provides communications between the client device and an application providing a service, and those packets may include the virtual MAC address of the virtual machine(s) that provide that application. Thus, at block 408, the layer 2 load balancing engine 304 in the switch device 300 may receive packets, identify the destination address of those packets, and determine when that destination address matches the virtual MAC address shared by the virtual machines provided by the server device cluster identified at block 406. With reference to FIG. 5, at block 408 the layer 2 load balancing engine 502 may receive packets that identify the virtual MAC address shared by the virtual machines 508a-514a provided on the server device cluster that includes the server devices 508-514. With reference to FIG. 6, at block 406 the layer 2 load balancing engine 502 may receive packets that identify the first virtual MAC address shared by the virtual machines 508a and 510a provided on the first server device cluster that includes the server devices 508 and 510.

The method 400 then proceeds to block 410 where the switch device directs packets belonging to the packet flow to a virtual machine on one of the server devices in the server cluster. In an embodiment, at block 410 and for packets that identify the virtual MAC address shared by the virtual machines provided by the server device cluster identified at block 406, the layer 2 load balancing engine 304 in the switch device 300 may direct those packets to particular virtual machines provided on particular server devices. As would be appreciated by one of skill in the art in possession of the present disclosure, packets that are part of a packet flow, which provides communications between a client device and an application running on a virtual machine provided on a server device, may be associated with a particular "application session" that may be specific to a particular one of the applications running on a particular one of the virtual machines provided on a particular one of the server devices. As such, it may be desirable that each of the packets that are received from a particular client device and that are part of a particular packet flow be sent to the same application running on the same virtual machine provided on the same server device. In some embodiments, this may be accomplished by the layer 2 load balancing engine 304 in the switch device 300 performing a hashing operation on each of the packets received in that packet flow in order to direct those packets to that application running on that virtual machine provided on that server device.

For example, at block 410, the layer 2 load balancing engine 304 in the switch device 300 may perform the hashing operation using data in fields of the packet header in the packet that is received at block 408, which may include data such as a source MAC address, a destination MAC address, a source IP address, a destination IP address, and/or any other packet information that would be apparent to one of skill in the art in possession of the present disclosure. Furthermore, the hashing operation performed at block 410 may use data in a Transport Control Protocol (TCP) header and/or a User Datagram Protocol (UDP) header such as, for example, a source port identifier, a destination port identifier, and/or other TCP/UDP header information that would be apparent to one of skill in the art in possession of the present disclosure. As will be appreciated by one of skill in the art in possession of the present disclosure, the hashing operation performed on the packet header (and/or TCP/UDP header) by the layer 2 load balancing engine 304 in the switch device 300 will provide for the transmission of the associated packet in the packet flow (and each of the other packets in that packet flow) to the same server device providing the same virtual machine upon which the same application is running. For example, with reference to FIG. 5, at block 408 the layer 2 load balancing engine 502 may direct each of the packets that are part of a particular packet flow to the virtual machine 510a provided on the server device 510 such that the application 516 running on that virtual machine 510a receives those packets in that packet flow. With reference to FIG. 6, at block 408 the layer 2 load balancing engine 502 may direct each of the packets that are part of a particular packet flow to the virtual machine 508a provided on the server device 508 such that the application 602 running on that virtual machine 508a receives those packets in that packet flow. As such, application sessions between a client device and an application running on one of a plurality of virtual machines provided on a plurality of different server devices may be maintained.

The method 400 may then return to decision block 402 and loop back through the method 400 to, for example, identify new server clusters sharing a virtual MAC address, and receive and direct packets to virtual machines provided on the server devices in those server clusters. For example, with reference to the embodiment illustrated in FIG. 6, at the second iteration of block 402 the virtual machines 512a and 514a may each transmit their shared "second" virtual MAC address to the ports 506c and 506d, respectively, such that it is received by the layer 2 load balancing engine 502 during a second time period (which may be the same or different than the first time period discussed above.) For example, each of the virtual machines 512a and 514a may generate and transmit a GARP communication 608 that includes the shared second virtual MAC address to the ports 506c and 506d, respectively, such that those GARP communications 608 are received by the layer 2 load balancing engine 502 during the second time period.

In some embodiments, each of the virtual machines 508a-514a in the server devices 508-514, respectively, may advertise both the first virtual MAC address and the second virtual MAC address discussed above. Further still, in some embodiments, each of the virtual machines 508a-514a in the server devices 508-514, respectively, may advertise the first virtual MAC address, while a subset of the virtual machines 508a-514a in the server devices 508-514, respectively, may advertise the second virtual MAC address. In such situations, each of the ports 308a-e in the switch device 300 may listen for the first virtual MAC address and the second virtual MAC address, or a first subset of the ports 308a-e in the switch device 300 may listen for the first virtual MAC address while a second subset of the ports 308a-e in the switch device 300 (which may or may not overlap with the first subset) may listen for the second virtual MAC address. In any of those situations, a separate instance of state may be preserved and operated on via the functionality discussed above for each respective virtual MAC address received on more than one of the ports 308a-e on the switch device 300.

At the second iteration of block 406, the layer 2 load balancing engine 502 may identify a second server device cluster that includes the server devices 512 and 514 that are connected to the ports 506c and 506d, and that each provided a GARP communication 608 including a common second virtual MAC address within the second time period. At the second iteration of block 408, the layer 2 load balancing engine 502 may receive packets that identify the second virtual MAC address shared by the virtual machines 512a and 514a provided on the second server device cluster that includes the server devices 512 and 514. At the second iteration of block 410, the layer 2 load balancing engine 502 may direct each of the packets that are part of a particular packet flow to the virtual machine 512a provided on the server device 512 such that the application 604 running on that virtual machine 512a receives those packets. One of skill in the art in possession of the present disclosure will recognize that the method 400 may loop any number of times to provide the layer 2 load balancing for any number of packet flows present in a datacenter/network.

Thus, systems and methods have been described that provide a switch device that accepts the same virtual MAC address at any of a plurality of its ports (e.g., via GARP communications from server devices coupled to those ports), while suppressing MAC-move operations that would normally be performed in response. The switch device then identifies the server devices that provided the virtual MAC address to its ports as part of a server device cluster (while excluding server devices that do not provide the virtual MAC address to any of its ports as part of that server device cluster), and then performs hashing operations on packets that are directed to the virtual MAC address based on fields in their packet headers, which provides for the directing of each of the packets that are part of a particular packet flow to particular virtual machines provided on particular server devices in the server device cluster. As such, purely layer 2 switch devices (or switch devices connected to server devices by purely layer 2 connections) may load balance packets to multiple server devices that are connected to its different ports and that include virtual machines that share a common virtual MAC address to which those packets are directed.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A layer 2 load balancing system, comprising:
a plurality of first server devices;
a plurality of first virtual machines that are provided on the plurality of first server devices and that each share a first virtual Media Access Control (MAC) address; and
a switch device that is coupled to each of the plurality of first server devices via respective first ports on the switch device, wherein the switch device is configured to:
receive, during a first time period via each of the respective first ports connected to the plurality of first server devices, the first virtual MAC address;
identify, in response to receiving the first virtual MAC address via each of the respective first ports, a first server device cluster that shares the first virtual MAC address;
receive packets that are part of a first packet flow and that are directed to the first virtual MAC address; and direct each of the packets that are part of the first packet flow to one of the plurality of first virtual machines that is provided on one of the plurality of first server devices in the first server device cluster.

2. The system of claim 1, further comprising:
a plurality of second server devices;
a plurality of second virtual machines that are provided on the plurality of second server devices and that each share a second virtual MAC address; and
a switch device that is coupled to each of the plurality of second server devices via respective second ports on the switch device, wherein the switch device is configured to:
receive, during a second time period via each the respective second ports connected to the plurality of second server devices, the second virtual MAC address;
identify, in response to receiving the second virtual MAC address via each of the respective second ports, a second server device cluster that shares the second virtual MAC address;
receive packets that are part of a second packet flow and that are directed to the second virtual MAC address; and
direct each of the packets that are part of the second packet flow to one of the plurality of second virtual machines that is provided on one of the plurality of second server devices in the second server device cluster.

3. The system of claim 1, wherein the switch device is configured to:
suppress, in response to receiving the first virtual MAC address via each of the respective first ports, MAC-move operations.

4. The system of claim 1, wherein directing each of the packets that are part of the first packet flow to the one of the plurality of first virtual machines includes:
performing a hashing operation on each of the packets that are part of the first packet flow, wherein the hashing operation provides for the directing of each of packets that are part of the first packet flow to the one of the plurality of first virtual machines.

5. The system of claim 1, wherein the first virtual MAC address is received via each the respective first ports in a Gratuitous Address Resolution Protocol (GARP) communication from each of the plurality of virtual machines provided each of the plurality of first server devices.

6. The system of claim 1, wherein the switch device is configured to:
determine that one of the plurality of first server devices is unavailable and, in response, remove that first server device from the first server device cluster.

7. An Information Handling System (IHS), comprising:
a processing system; and
a memory system that is coupled to the processing system and that includes instructions that, when executed by the processing system, cause the processing system to provide a layer 2 load balancing engine that is configured to:
receive, during a first time period via each of a plurality of first ports that are connected to respective first server devices that provide a plurality of first virtual machines, a first virtual MAC address;
identify, in response to receiving the first virtual MAC address via each of the plurality of first ports, a first server device cluster that shares the first virtual MAC address;
receive packets that are part of a first packet flow and that are directed to the first virtual MAC address; and
direct each of the packets that are part of the first packet flow to one of a plurality of first virtual machines that is provided on one of the plurality of first server devices in the first server device cluster.

8. The IHS of claim 7, wherein the layer 2 load balancing engine is configured to:
receive, during a second time period via each of a plurality of second ports that are connected to respective second server devices that provide a plurality of second virtual machines, a second virtual MAC address;
identify, in response to receiving the second virtual MAC address via each of the plurality of second ports, a second server device cluster that shares the second virtual MAC address;
receive packets that are part of a second packet flow and that are directed to the second virtual MAC address; and
direct each of the packets that are part of the second packet flow to one of a plurality of second virtual machines that is provided on one of the plurality of second server devices in the second server device cluster.

9. The IHS of claim 7, wherein the layer 2 load balancing engine is configured to:
suppress, in response to receiving the first virtual MAC address via each of the plurality of first ports, MAC-move operations.

10. The IHS of claim 7, wherein directing each of the packets that are part of the first packet flow to the one of the plurality of first virtual machines includes:
performing a hashing operation on each of the packets that are part of the first packet flow, wherein the hashing operation provides for the directing of each of packets that are part of the first packet flow to the one of the plurality of first virtual machines.

11. The IHS of claim 7, wherein the first virtual MAC address is received via each the respective first ports in a Gratuitous Address Resolution Protocol (GARP) communication from each of the plurality of virtual machines provided each of the plurality of first server devices.

12. The IHS of claim 7, wherein the layer 2 load balancing engine is configured to:
determine that one of the plurality of first server devices is unavailable and, in response, remove that first server device from the first server device cluster.

13. The IHS of claim 7, wherein the layer 2 load balancing engine is configured to:
determine, during the first time period, that the first virtual MAC address has not been received via a second port that is connected to respective first server device that provides one of the plurality of first virtual machines and, in response, exclude the first server device that is connected to the second port from the first server device cluster.

14. A method for layer 2 load balancing, comprising:
receiving, by a switch device during a first time period via each of a plurality of first ports on the switch device that are connected to respective first server devices that provide a plurality of first virtual machines, a first virtual MAC address;
identifying, by the switch device in response to receiving the first virtual MAC address via each of the plurality of first ports, a first server device cluster that shares the first virtual MAC address;

receiving, by the switch device, packets that are part of a first packet flow and that are directed to the first virtual MAC address; and directing, by the switch device, each of the packets that are part of the first packet flow to one of a plurality of first virtual machines that is provided on one of the plurality of first server devices in the first server device cluster.

15. The method of claim 14, further comprising:

receiving, by the switch device during a second time period via each of a plurality of second ports on the switch device that are connected to respective second server devices that provide a plurality of second virtual machines, a second virtual MAC address;

identifying, by the switch device in response to receiving the second virtual MAC address via each of the plurality of second ports, a second server device cluster that shares the second virtual MAC address;

receiving, by the switch device, packets that are part of a second packet flow and that are directed to the second virtual MAC address; and directing, by the switch device, each of the packets that are part of the second packet flow to one of a plurality of second virtual machines that is provided on one of the plurality of second server devices in the second server device cluster.

16. The method of claim 14, further comprising:

suppressing, by the switch device in response to receiving the first virtual MAC address via each of the plurality of first ports, MAC-move operations.

17. The method of claim 14, wherein directing each of the packets that are part of the first packet flow to the one of the plurality of first virtual machines includes:

performing, by the switch device, a hashing operation on each of the packets that are part of the first packet flow, wherein the hashing operation provides for the directing of each of packets that are part of the first packet flow to the one of the plurality of first virtual machines.

18. The method of claim 14, wherein the first virtual MAC address is received via each the respective first ports in a Gratuitous Address Resolution Protocol (GARP) communication from each of the plurality of virtual machines provided each of the plurality of first server devices.

19. The method of claim 14, further comprising:

determining, by the switch device, that one of the plurality of first server devices is unavailable and, in response, removing that first server device from the first server device cluster.

20. The method of claim 14, further comprising:

determining, by the switch device during the first time period, that the first virtual MAC address has not been received via a second port on the switch device that is connected to respective first server device that provides one of the plurality of first virtual machines and, in response, exclude the first server device that is connected to the second port from the first server device cluster.

* * * * *